May 18, 1937. L. A. ROEMER 2,080,673
STEEL PULLER
Filed Sept. 16, 1936
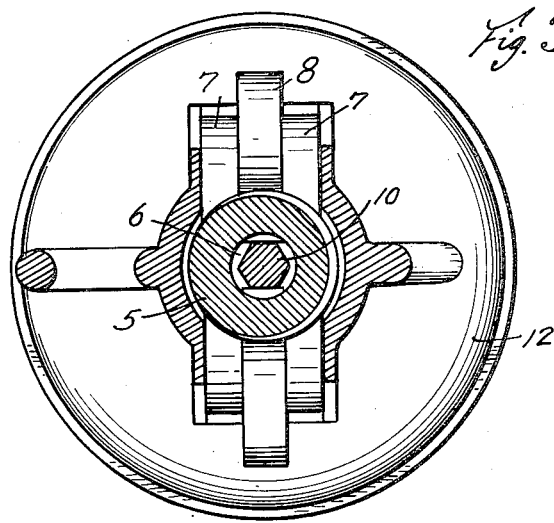
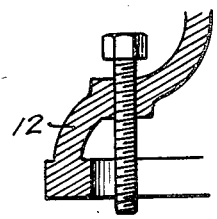
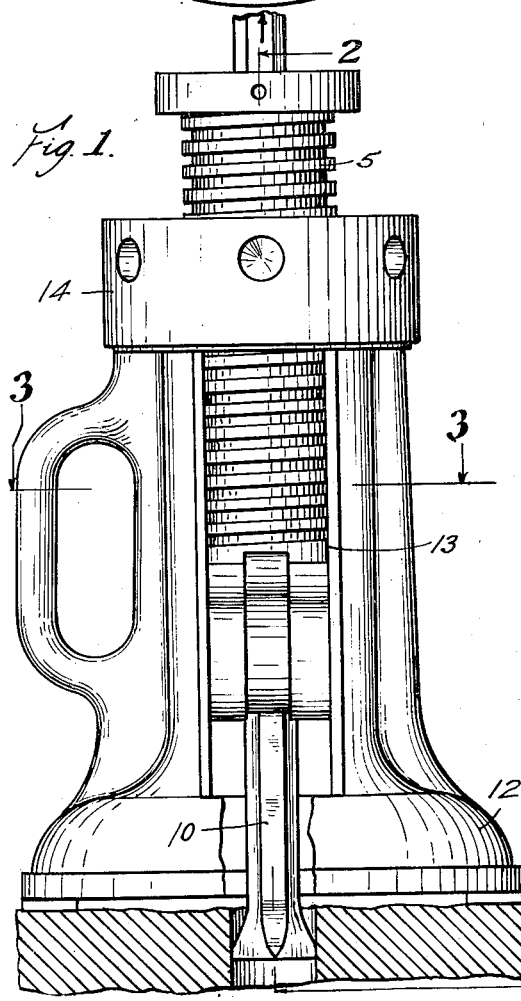
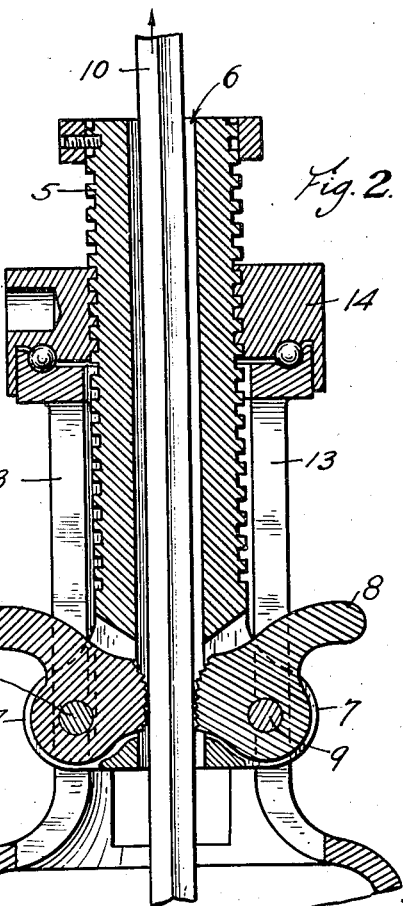
Inventor:
Lowell A. Roemer
By G. F. McDougall
Attorney.

Patented May 18, 1937

2,080,673

UNITED STATES PATENT OFFICE 2,080,673

STEEL PULLER

Lowell A. Roemer, Longview, Wash.

Application September 16, 1936, Serial No. 101,066

3 Claims. (Cl. 254—30)

My invention relates to jackscrews which incorporate pulling devices with self tightening engaging means for an article to which pulling force is to be applied.

In drilling rock, breaking up old paving, mining and quarrying and other employments of the jackhammer or air drilling machine using percussion drills, the drilling tool, almost universally known as "steel", frequently becomes stuck in the hole, wedged into a crack or otherwise so firmly held that it is a very difficult and time consuming task to get it out.

The principal purpose of my invention is a tool that may be quickly engaged with a piece of stuck steel and by virtue of a powerful jackscrew employed gets the steel out. Since time is the essence of such a job, employed equipment costing many dollars per hour, and one man's work depending on that of another, it is important that the workman shall not need to hunt for wrenches to tighten the gripping device to the tool, but may apply the tool to a projecting bit of steel and loosen it with a few quick motions, usually requiring less than a minute.

I accomplish the objects specifically mentioned and others that will be apparent from this specification by the device illustrated in the accompanying drawing, forming a part thereof in which,—

Fig. 1 is a side elevation with part of the base broken away to show the end of the drill, and illustrated as resting on a rock or the like;

Fig. 2 is a longitudinal section of Fig. 1 on the line 2—2 of Fig. 1;

Fig. 3 is a section on the line 3—3 of Fig. 1; and

Fig. 4 is a fragmentary view showing a leveling screw inserted through a rim of the base as an alternative construction and which will prove useful if the surface upon which the steel puller rests is at a considerable angle from the axis of the hole which has been drilled.

In the drawing 5 is a jackscrew member operating in the well known manner. It has a hollow or bore 6, formed axially of the screw and upon the lower end are integrally formed opposed dog mountings 7.

Eccentric dogs 8, are pivotally mounted at 9 and are movable in the mountings on said pivots to engage or disengage a rod-like member such as the "steel" 10 which is shown in Fig. 2 to be projecting upwardly through the hollow bore 6.

The screw is mounted for movement on the base member 12, which is provided with longitudinal vertical slots 13, on opposite sides thereof, which slots serve as guides for the dog mountings 7. They are preferably made a smooth running fit with respect to each other.

Mounted upon the top of the base 12, is a rotary nut 14, which serves to raise and lower the screw 5.

To use the device to remove a fouled drill steel, the jackhammer is taken off, requiring about ten seconds. The jack is placed over the steel which projects up into the hollow screw portion, the dogs 8 are grasped with one hand to bring them into initial engagement with the steel while the other hand spins the nut 14 or the latter is turned by means of a jack-bar when the engagement becomes positive and the full power of the jack can be applied to the purpose of lifting the steel. As soon as the steel loosens, requiring ordinarily less than an inch of actual lift, the workman grasps the body of the jack and lifts steel and jack together. As soon as the steel is clear of the hole, he jams the point of the steel against the general rocky surface or other solid object, when the steel will easily reverse the dogs and can be pulled from the jack by hand.

The jack is as useful as the well known screw jacks, frequently required around a construction or wrecking job; hence my new tool is not an extra piece of equipment to be purchased, but an improved one that will serve for a new use in a better way than any other equivalent tool has heretofore been made to serve.

Having thus fully disclosed my invention, what I claim as new and desire to secure by Letters Patent, is,—

1. In a jackscrew pulling device, a base member provided with a pair of oppositely disposed vertical slots, a hollow non-turning screw that is vertically movable with respect to the base, a pair of integral wing extensions formed on the screw that are adapted to move in the slots and an eccentric dog pivotally mounted in each wing extension, that is movable to positively engage a rod-like article that projects inside the hollow portion of the screw.

2. A jackscrew type steel puller, defined in part as a base member, a hollow non-rotative screw member mounted for axial movement with respect to the base, a pair of opposed eccentric dogs pivotally mounted adjacent the lower end of the screw that are movable on their respective pivots to positively engage a drill steel or the like that projects into the hollow of the screw, and an enlarged dog mounting adjacent the lower end of the screw that is in slidable non-rotative engagement with the base.

3. A jackscrew type steel puller defined in part as a base member of substantial height provided with a pair of oppositely disposed vertical guide slots formed therein, a hollow screw member that is arranged for vertical movement with respect to the base, a pair of bifurcated wings integrally formed on the lower end of the screw that are adapted to vertical movement in the slots of the base, pivots through the bifurcated portion of the wings and eccentric dogs mounted on the pivots that are movable under the influence of the screw to tighten against and positively engage a steel or the like, that projects upwardly into the hollow of the screw.

LOWELL A. ROEMER.